United States Patent
Gray et al.

(10) Patent No.: US 11,807,729 B2
(45) Date of Patent: Nov. 7, 2023

(54) POLYETHYLENE TEREPHTHALATE-POLYETHYLENE NAPHTHALATE COPOLYMER EXTRUDED SHEET SUITABLE FOR MEDICAL DEVICE PACKAGING

(71) Applicants: Josh D. Gray, Janesville, WI (US); Michael Pregont, Madison, WI (US); Nirav Desai, Verona, WI (US)

(72) Inventors: Josh D. Gray, Janesville, WI (US); Michael Pregont, Madison, WI (US); Nirav Desai, Verona, WI (US)

(73) Assignee: GOEX Corporation, Janesville, WI (US)

(*) Notice: Subject to any disclaimer, the term of this patent is extended or adjusted under 35 U.S.C. 154(b) by 0 days.

(21) Appl. No.: 17/647,922

(22) Filed: Jan. 13, 2022

(65) Prior Publication Data

US 2022/0332907 A1  Oct. 20, 2022

Related U.S. Application Data

(60) Provisional application No. 63/174,793, filed on Apr. 14, 2021.

(51) Int. Cl.
| | | |
|---|---|---|
| C08J 5/18 | (2006.01) | |
| B29C 48/00 | (2019.01) | |
| B29C 48/08 | (2019.01) | |
| B29L 31/00 | (2006.01) | |
| B29K 105/00 | (2006.01) | |
| B29L 7/00 | (2006.01) | |

(52) U.S. Cl.
CPC ............. *C08J 5/18* (2013.01); *B29C 48/0017* (2019.02); *B29C 48/022* (2019.02); *B29C 48/08* (2019.02); *B29K 2105/0085* (2013.01); *B29L 2007/008* (2013.01); *B29L 2031/712* (2013.01); *C08J 2367/03* (2013.01)

(58) Field of Classification Search
CPC ..... C08J 5/18; C08J 2367/03; B29C 48/0017; B29C 48/022; B29C 48/08; B29K 2105/0085; B29L 2007/008; B29L 2031/712
See application file for complete search history.

(56) References Cited

U.S. PATENT DOCUMENTS

| | | |
|---|---|---|
| 5,868,244 A | 2/1999 | Ivanov et al. |
| 6,461,698 B1 | 10/2002 | Bassam et al. |
| 7,617,932 B2 | 11/2009 | Windus-Smith et al. |
| 8,960,432 B2 | 2/2015 | Agrawal |
| 8,973,748 B2 | 3/2015 | Wu |
| 8,997,978 B2 | 4/2015 | Stopek et al. |
| 9,358,070 B2 | 6/2016 | Cage et al. |
| 9,532,847 B2 | 1/2017 | Hendrickson et al. |

(Continued)

FOREIGN PATENT DOCUMENTS

EP  0918064 A2  5/1999

OTHER PUBLICATIONS

"Naphthalates", BP Literature, 2001, pp. 1-9.

*Primary Examiner* — Michael C Miggins
(74) *Attorney, Agent, or Firm* — Grossman, Tucker, Perreault & Pfleger PLLC; Steven J. Grossman

(57) ABSTRACT

The present invention is directed at poly(ethylene terephthalate)-poly(ethylene naphthalate) (PET-PEN) copolymer extruded sheet that is thermoformable and particularly suitable for medical device packaging, as well as medical device packaging made from such PET-PEN sheet material.

3 Claims, 5 Drawing Sheets

(56) References Cited

U.S. PATENT DOCUMENTS

| | | |
|---|---|---|
| 9,623,171 B2 | 4/2017 | Okihara et al. |
| 10,052,455 B1 | 8/2018 | Anderson |
| 10,617,844 B2 | 4/2020 | McNabb et al. |
| 10,695,143 B2 | 6/2020 | Gallagher |
| 10,820,959 B2 | 11/2020 | Weber et al. |
| 2003/0183547 A1 | 10/2003 | Heyman |
| 2003/0235701 A1 | 12/2003 | Kliesch et al. |
| 2005/0061700 A1 | 3/2005 | Windus-Smith et al. |
| 2005/0218024 A1 | 10/2005 | Lang et al. |
| 2006/0231442 A1 | 10/2006 | Windus-Smith et al. |
| 2006/0284334 A1 | 12/2006 | Christel |
| 2008/0171972 A1 | 7/2008 | Stopek |
| 2010/0036359 A1 | 2/2010 | Stopek et al. |
| 2010/0116694 A1 | 5/2010 | Stopek et al. |
| 2013/0197618 A1 | 8/2013 | Cage et al. |
| 2014/0305827 A1 | 10/2014 | Agrawal |
| 2014/0353190 A1 | 12/2014 | Okihara et al. |
| 2015/0021221 A1 | 1/2015 | Hendrickson et al. |
| 2018/0162619 A1 | 6/2018 | Kocur et al. |
| 2018/0228998 A1 | 8/2018 | Anderson |
| 2018/0250495 A1 | 9/2018 | McNabb et al. |
| 2019/0126004 A1 | 5/2019 | O'Brien et al. |
| 2019/0151605 A1 | 5/2019 | McMenamin et al. |
| 2019/0247137 A1 | 8/2019 | Gallagher |
| 2020/0230349 A1 | 7/2020 | McMenamin et al. |

POLYETHYLENE TEREPHTHALATE-POLYETHYLENE NAPHTHALATE COPOLYMER EXTRUDED SHEET SUITABLE FOR MEDICAL DEVICE PACKAGING

CROSS REFERENCE TO RELATED APPLICATIONS

This application claims the benefit of U.S. Provisional Application No. 63/174,793, filed Apr. 14, 2021, which is hereby incorporated by reference.

FIELD

The present invention is directed at poly(ethylene terephthalate)-poly(ethylene naphthalate (PET-PEN) copolymer extruded sheet that is thermoformable and particularly suitable for medical device packaging, as well as medical device packaging made from such PET-PEN sheet material.

BACKGROUND

Medical device packaging is typically designed to package and protect a given medical device and maintain their sterile condition prior to use. Various types of packaging are available on the market, each with its own reported advantages. For tray materials, some of the resins that are typically employed include poly(ethylene terephthalate glycol) or PETG, polyvinyl chloride (PVC), polycarbonate (PC), polypropylene (PP) and high impact polystyrene. PETG is a perhaps the most common material, given its transparency, relative mechanical strength and its compatibility with various sterilization methods. However, there remains an on-going need to provide medical device packaging that would improve the integrity of the packaging through-out its entire life-cycle, including shipping, storage, use, and sterilization.

SUMMARY

A sheet of polymeric material, capable of being thermoformed into a desired shape, comprising poly(ethylene terephthalate)-poly(ethylene naphthalate (PET-PEN) copolymer where the PEN is present at a level of 2.0% to 15.0% by weight and wherein said PET-PEN copolymer is present in said sheet at a level of at least 80.0% by weight.

A medical device package comprising poly(ethylene terephthalate)-poly(ethylene naphthalate (PET-PEN) copolymer where the PEN is present at a level of 2.0% to 15.0% by weight and wherein said PET-PEN copolymer is present at a level of at least 80.0% by weight.

A method of forming polymeric sheet comprising: (a) providing poly(ethylene terephthalate)-poly(ethylene naphthalate (PET-PEN) copolymer where the PEN is present at a level of 2.0% to 15.0% by weight and said copolymer has an intrinsic viscosity of 0.64 dL/g to 0.90 dL/g; and (b) extruding and forming said copolymer into sheet having a thickness in the range of 0.01 inches to 0.06 inches.

A method of forming a medical device package comprising: (a) providing poly(ethylene terephthalate)-poly(ethylene naphthalate (PET-PEN) copolymer where the PEN is present at a level of 2.0% to 15.0% by weight and said copolymer has an intrinsic viscosity of 0.64 dL/g to 0.90 dL/g; (b) extruding and forming said copolymer into sheet having a thickness in the range of 0.01 inches to 0.06 inches; and (c) thermoforming said sheet into a desired shape at a temperature in the range of 245° F. to 315° F.

DETAILED DESCRIPTION

The present invention stands directed at the extruded sheet material of poly(ethylene terephthalate)-poly(ethylene naphthalate) (PET-PEN) copolymers, that is particularly suitable for medical device packaging. The PET-PEN copolymer may have the following general structure:

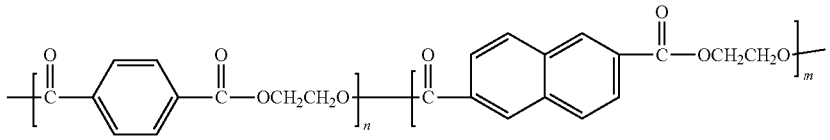

As can be appreciated from the above, the relative amount of the PET and PEN segments may vary. Preferably, it has been found herein that for the PET-PEN copolymer extruded sheet, the PEN is present at a level of 2.0% to 15.0% by weight, more preferably in the range of 4.0% by weight to 12.0% by weight. Moreover, the PET-PEN copolymer itself is preferably present in the extruded sheet and/or given medical device package (e.g. a as a tray), at a level of 80.0% by weight or more. Accordingly, the PET-PEN copolymer is present at a level of at least 80.0% by weight and there may be up to 20% by weight of another polymeric resin, which may be, e.g., PET or PETG. In the broad context of the present invention, the PET-PEN copolymer extruded sheet or medical device packaging preferably is sourced from a PET-PEN copolymer comprising, consisting essential of, or consisting of 80.0% by weight, or 85.0% by weight, or 90.0% by weight, or 95.0% by weight, or 100% by weight of PET-PEN copolymer.

By way of further example, the PET-PEN copolymer extruded sheet and/or medical device packaging may therefore be comprised of, consist essentially of, or consist of 80% by weight of PET-PEN copolymer and 20% by weight of PET and/or PETG, or 85% by weight of PET-PEN copolymer and 15% by weight of PET and/or PETG, or 90% by weight of PET-PEN copolymer and 10% by weight of PET and/or PETG, or 95% by weight of PET-PEN copolymer and 5% by weight of PET and/or PETG. As noted, the medical device packaging may be in the form of a tray, and including a covering of a different material, such as a film or non-woven material, resistant to bacterial penetration, such as the material sold under the trademark TYVEK®, which is made from polyethylene fibers that are randomly laid and compressed to form a nonwoven material.

The PET-PEN copolymer extruded sheet herein, that is suitable for thermoforming, is preferably extruded at an extrusion melt temperature of 520° F. to 570° F. The PET-PEN extruded sheet also preferably indicates an intrinsic viscosity of greater than or equal to 0.64 dL/g, or in the range of 0.64 dL/g to 0.90 dL/g, more preferably in the range of 0.74 dL/g to 0.84 dL/g. The PET-PEN extruded sheet also preferably has a thickness in the range of 0.01 inches to 0.06 inches which extruded sheet can then be thermoformed at the preferred temperature range of 245° F. to 315° F.

Figure 1:
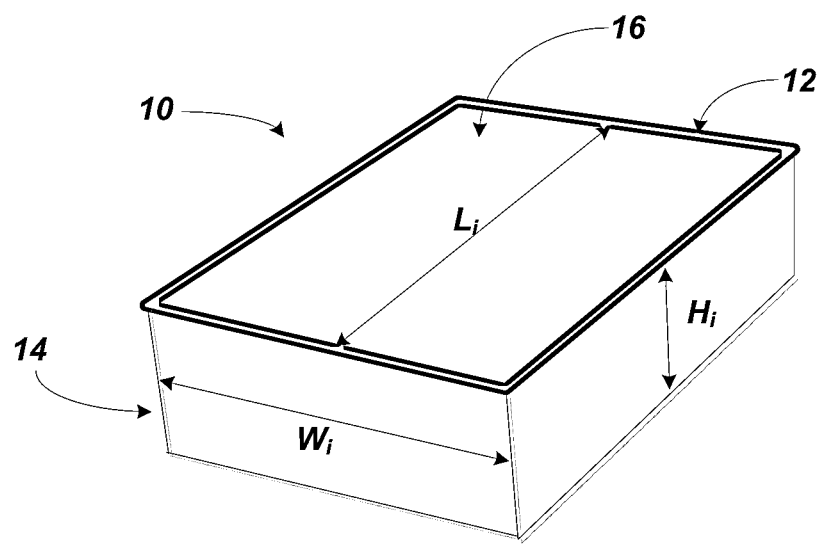
FIG. 1 is a perspective view of a medical device package herein.

Reference to thermoforming is reference to the general procedure of extruding a sheet feedstock, having the preferred thickness range herein of 0.01 inches to 0.06 inches and then forming the sheet into a desired configuration (e.g., the medical device package as shown in FIG. 1) with heat, vacuum and pressure.

The PET-PEN copolymer preferably provides a glass transition temperature of greater than or equal to 81.0° C. (≥81.0° C.) for the extruded sheet and/or medical device packaging, which as noted, is preferably a package tray. More preferably, the glass transition temperature falls in the range of 81.0° C. to 86.0° C. Such glass transition temperature is measured by ASTM D3418-15 (Standard Test Method For Transition Temperatures And Enthalpies of Fusion And Crystallization Of Polymers By Differential Scanning calorimetry). The PET-PEN copolymer employed to form the extruded sheet and/or medical device packaging preferably provides a heat distortion temperature (HDT) of greater than or equal to 72.0° C. at 66 psi, or more preferably in the range of 72.0° C. to 78.0° C. at 66 psi. Such heat distortion temperature is measured by ASTM D648-18 (Standard Test Method For Deflection Temperature Of Plastics Under Flexural Load In The Edgewise Position).

It is worth noting that with regards to the above thermal properties (Tg and HDT), the formation of extruded sheet material and/or medical device packaging with such characteristics, is such that it uniquely provides for the ability to withstand multiple heat sterilization cycles at elevated temperatures. This then is contemplated to translate into an overall relatively faster sterilization cycle time. In that regard, the extruded sheet herein, suitable for thermoforming and formation of a medical device package, preferably indicates the following mechanical properties as shown in Table 1:

TABLE 1

Mechanical Properties Of PET-PEN Copolymers

| Parameter | Test Method | Unit | Direction | PET-PEN Copolymer |
|---|---|---|---|---|
| Tensile Modulus | ASTM D882 | Psi (ave) | MD | 260,406 |
|  |  |  | TD | 248,478 |
| Tensile Strength | ASTM D882 | Psi (ave) | MD | 8,367 |
|  |  |  | TD | 7,985 |

TABLE 1-continued

Mechanical Properties Of PET-PEN Copolymers

| Parameter | Test Method | Unit | Direction | PET-PEN Copolymer |
|---|---|---|---|---|
| Breaking Factor | ASTM D882 | Lbf/in (ave) | MD | 251 |
|  |  |  | TD | 240 |
| Flexural Modulus | ASTM D790 | Psi (ave) | MD | 478,851 |
|  |  |  | TD | 492,067 |
| Puncture Max Force | ASTM F1306 | Lbf/in (ave) | NA | 59.41 |
| Puncture Energy | ASTM F1306 | Lbf/in (ave) | NA | 11.20 |

As can therefore be seem from the above, the PET-PEN copolymer herein is one that has one or more of the following mechanical properties:
   (a) Tensile modulus in the machine direction of at least 260,000 psi and in the transverse direction of at least 248,000 psi;
   (b) Tensile strength in the machine direction of at least 8,300 psi and in the transverse direction of at least 7950 psi; or
   (c) Flexural modulus in the machine direction of at least 475,000 psi and in the transverse direction of at least 490,000 psi.

Accordingly, the PET-PEN thermoformable sheet and/or medical device packaging herein is such that it may undergo multiple heat and/or EO sterilization procedures, wherein the mechanical properties in Table 1 above do not fall by more than 10%. For example, the flexural modulus noted above for the extruded sheet in the machine direction (MD) is 478,851 psi and in the transverse direction (TD) is 492,067 psi. It is contemplated that after 2 cycles at a sterilization temperature of 35° C. to 65° C., in the presence of ethylene oxide (EO) or in conjunction with gamma radiation, the values for the flex modulus in either the MD and/or TD will not fall by more than 10%.

The PET-PEN copolymer herein is such that it indicates a moisture absorption in the range of 0.20% (wt.) to 0.40% (wt). It can be appreciated that with this relatively low level of moisture absorption, the PET-PEN copolymer is such that during heat sterilization, where moisture is present, the glass transition temperature of the PET-PEN copolymer is not reduced due to significant moisture absorption. Accordingly, the PET-PEN copolymer herein will not otherwise tend to soften and vary in dimensions, thereby ensuring that the PET-PEN copolymer in either sheet form or in the form of medical device packaging can provide, e.g., dimensional stability over 2 cycles of the above referenced heat sterilization.

Reference to dimensional stability is reference to the feature that the sheet and/or medical device packaging herein made of the subject PET-PEN copolymer will not deform or alter in its original dimensions (length and/or width) by more than 2.0% after 2 heat sterilization cycles at temperatures in the range of 35° C. to 65° C., in the presence of ethylene oxide or in conjunction with gamma radiation. More preferably, the subject PET-PEN copolymer will not deform in its original dimensions after heat sterilization by more than 0.2% to 2.0%, and all values therein, in 0.1% increments. Accordingly, it is contemplated that the subject PET-PEN copolymer, in sheet or medical device packaging form, will not deform in its original dimensions after sterilization at temperatures in the range of 35° C. to 65° C., in the presence of ethylene oxide or in conjunction with gamma radiation, by more than 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9% or 2.0%.

By way of representative example, and with reference to FIG. 1, for a medical device package tray 10 made of PET-PEN copolymer herein, having an initial maximum length $L_i$, initial maximum width $W_i$, and initial maximum height $H_i$ such values are individually or collectively, are contemplated to not be subject to a change of more than 2.0% after 2 sterilization cycles at the temperature range of 35° C. to 65° C., in the presence of ethylene oxide or in conjunction with gamma radiation. More preferably, such initial length $L_i$, $W_i$ and height $H_i$ of a medical device package tray made of PET-PEN copolymer herein will not change its initial length $L_i$ and/or initial width $W_i$ and/or initial height $H_i$ by more than 0.2% to 2.0% after 2 sterilization cycles at the temperature range of 35° C. to 65° C., in the presence of ethylene oxide or in conjunction with gamma radiation. It should be noted that while FIG. 1 shows a general rectilinear shape (sides meeting at right angles), a medical device packaging herein made from the subject PET-PEN copolymer thermoformable sheet may assume any particular or desired shape in order to accommodate the size and shape of the medical device to be packaged.

It may also now be appreciated that the medical device packaging herein may be in the form of a tray or what may be termed a first package portion 14 comprised of the PET-PEN copolymer herein, where the first package portion will itself define a space for packaging a given medical device. The first package portion may preferably include a second package portion 16 releasably secured to the first package portion, where the first package portion 14 and the second package portion 16 may then in combination define a sealed space within which the medical device may be disposed.

The medical device package herein, formed from the subject PET-PEN copolymer, is as noted, directed to accommodate a medical device therein. Preferably, the medical device packaging is in the form of a tray, made from the PET-PEN copolymers, along with a front cover portion that is releasable secured to the PET-PEN tray portion. The tray portion may also preferably include a holding feature (an edge portion 12 as shown in FIG. 1) to facilitate holding of the tray while removing the second package portion. The preferred dimensions (length×width) for the medical device tray herein are 6.0"×12.0", 4.0"×8.0" and as large as 24.5"×72.0", but other dimensions are contemplated. The edge portion 12 as shown in FIG. 1. may preferably have a thickness in the range of 10 mil to 60 mil while other thicknesses are contemplated.

Figure 2:
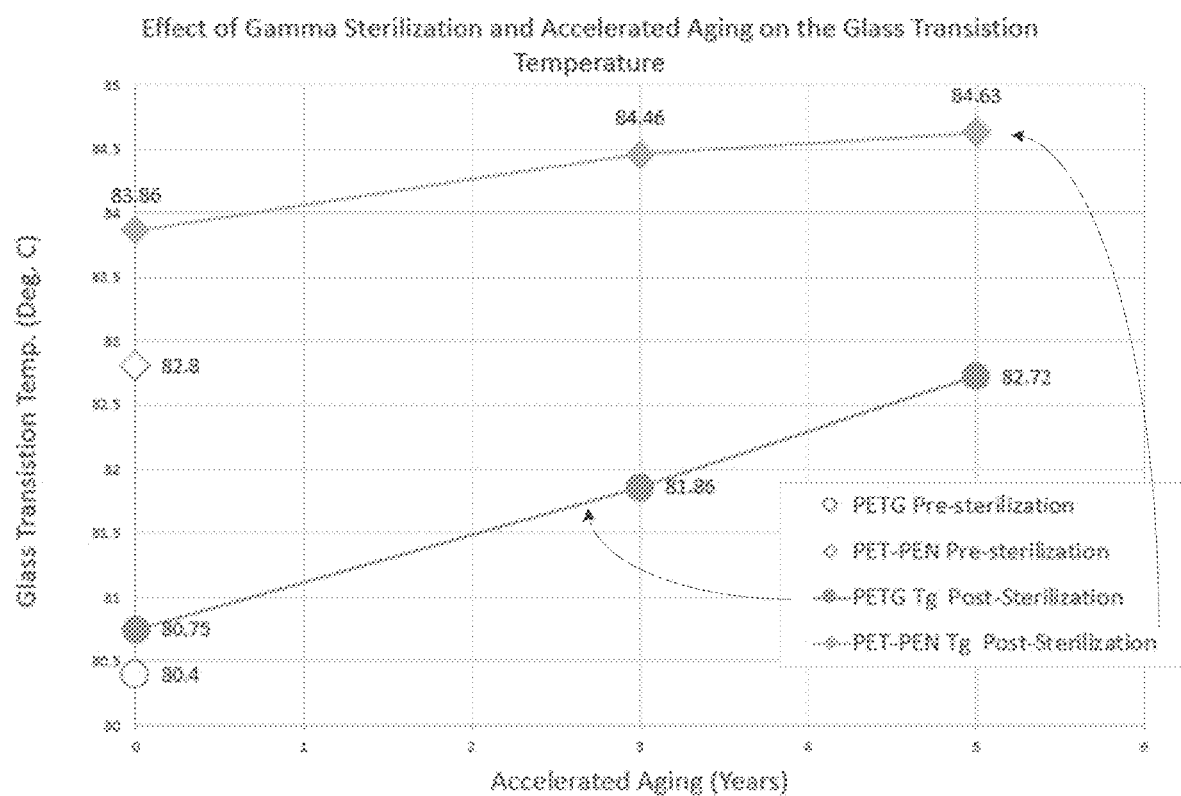
FIG. 2 is a plot showing the effect of gamma sterilization and accelerated aging on the glass transition temperature of the indicated resins.

Attention is next directed to FIG. 2 which is a plot showing the effect of gamma sterilization and accelerated aging on the glass transition temperature of the indicated resins. Reference to accelerated aging for the identified five (5) year term is achieved by exposure of the resins in sheet form to a temperature of 55° C. for a period of 198 days. According, about 40 days at a temperature of 55° C. therefore provides accelerated aging for a one-year period (i.e. what one would expect for exposure to ambient conditions for 365 days). As can be observed, the PET-PEN resin herein showed an increase in Tg value from 83.86° C. to what appears to be a leveling tendency at 84.63° C., whereas PETG appears to provide a regular increase from 80.75° C. to 81.86° C. and increasing to 82.72° C. This therefore suggests that the PET-PEN sheet herein maintains a relatively higher Tg over the accelerated again period of five (5) years as compared to PETG sheet.

Figure 3:
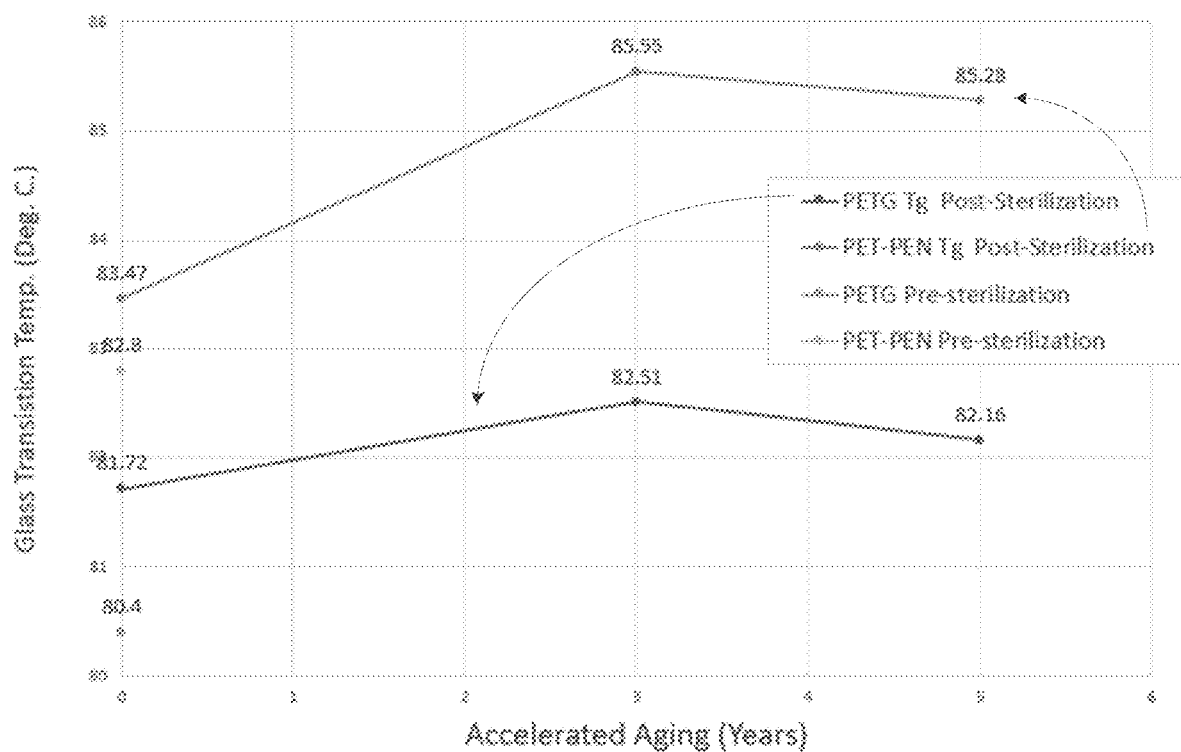
FIG. 3 is a plot showing the effect of ETO sterilization and accelerated aging on the glass transition temperature of the indicated resins.

FIG. 3 is a plot showing the effect of ETO sterilization and accelerated aging on the glass transition temperature of the indicated resins. As can again be seen, the PET-PEN sheet herein maintains a relatively higher Tg through-out the accelerated again period.

Figure 4:
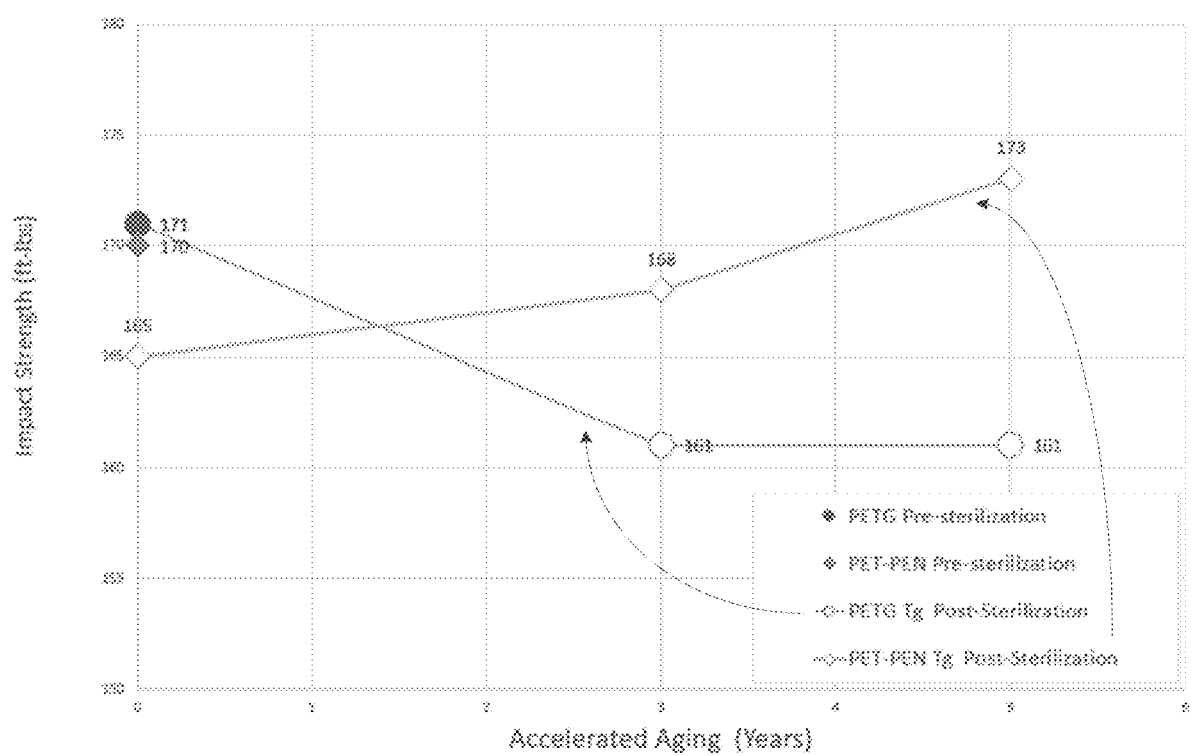
FIG. 4 is a plot showing the effect of gamma sterilization and accelerated aging on the impact strength of the indicated resins.

FIG. 4 is a plot showing the effect of gamma sterilization and accelerated aging on the impact strength of the indicated resins. As can be seen, the impact strength of the PET-PEN was significantly better compared to PETG, after accelerated again periods of 3-5 years.

Figure 5:
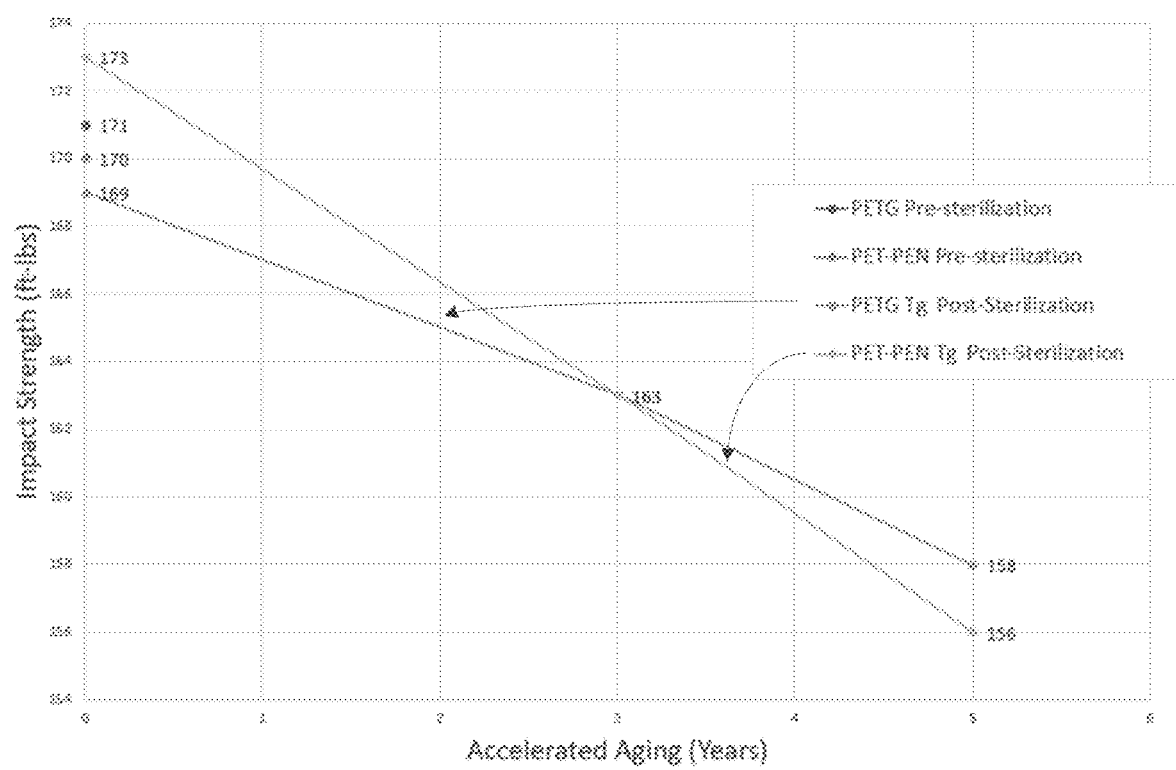
FIG. 5 is a plot showing the effect of ETO sterilization and accelerated aging on the impact strength of the indicated resins.

FIG. 5 is a plot showing the effect of ETO sterilization and accelerated aging on the impact strength of the indicated resins. As can be seen, at accelerated again periods of greater than 3 years and up to 5 years, the impact strength of the PET-PEN was again better than PETG.

With regards to the medical device packaging produced herein, it should be noted that it can preferably be configured as a sterile barrier system that prevents the ingress of microorganisms and allows the aseptic presentation of a product to a point of use. The packaging here is also contemplated to be one that prevents damage to the sterile marrier system from the time of assembly until the point of use.

Those of skill in the art will recognize that the present invention may appear in a variety of forms other than the specific preferred embodiments described and contemplated herein.

What is claimed is:

1. A sheet of polymeric material, capable of being thermoformed into a desired shape, comprising:
   poly(ethylene terephthalate)-poly(ethylene naphthalate (PET-PEN) copolymer where the PEN is present at a level of 2.0% to 15.0% by weight and wherein said PET-PEN copolymer is present in said sheet at a level of at least 80.0% by weight and includes poly(ethylene terephthalate or poly(ethylene terephthalate glycol) at a level of up to 20.0% by weight, wherein said PET-PEN copolymer has an intrinsic viscosity of 0.64 dL/g to 0.90 dL/g, a glass transition temperature, measured according to ASTM D3418-15 of greater than 81.0° C., a heat distortion temperature at 66 psi, as measured by ASTM D648-18 of greater than or equal to 72.0° C., wherein said sheet, at at thickness of 0.01 inches to 0.06 inches indicates one or more of the following mechanical properties:
   (a) tensile modulus in the machine direction of at least 260,000 psi and in the transverse direction of at least 248,000 psi;
   (b) tensile strength in the machine direction of at least 8,300 psi and in the transverse direction of at least 7950 psi; or
   (c) flexural modulus in the machine direction of at least 475,000 psi and in the transverse direction of at least 490,000 psi;
       wherein said sheet is thermoformable at a temperature in the range of 245° F. to 315° F.; has a moisture absorption in the range of 0.20% (wt.) to 0.40% (wt.) and wherein after 2 cycles at a sterilization temperature of 35° C. to 65° C., in the presence of ethylene oxide (EO) in conjunction with gamma radiation, the values of flexural modulus in either the machine direction and/or transverse direction will not fall by more than 10%.

2. The sheet of claim 1 wherein said sheet is thermoformable at a temperature in the range of 245° F. to 315° F.

3. The sheet of polymeric material of claim 1 wherein said sheet has original dimensions of length and width and does not deform or alter in said original dimensions by more than 0.2% to 2.0% after two heat sterilization cycles at temperatures in the range of 35° C. to 65° C.

* * * * *